(12) United States Patent
Cheng et al.

(10) Patent No.: US 8,449,162 B2
(45) Date of Patent: May 28, 2013

(54) BACKLIGHT MODULE WITH OPTICAL FILM HAVING NOTCHES

(75) Inventors: Wei-Hsuan Cheng, Hsin-Chu (TW); Li-Min Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 329 days.

(21) Appl. No.: 12/858,439

(22) Filed: Aug. 18, 2010

(65) Prior Publication Data

US 2011/0116285 A1  May 19, 2011

(30) Foreign Application Priority Data

Nov. 18, 2009 (TW) .............................. 98139250 A

(51) Int. Cl.
*F21V 7/22* (2006.01)

(52) U.S. Cl.
USPC ............................ 362/607; 362/612; 362/613

(58) Field of Classification Search
CPC .... C08L 1/00; C08L 23/00; G02B 6/00; G02B 6/05
USPC ......................................... 362/606–609, 620
See application file for complete search history.

(56) References Cited

U.S. PATENT DOCUMENTS

| 2007/0127261 | A1* | 6/2007 | An et al. ........................ 362/608 |
| 2009/0251921 | A1 | 10/2009 | Toussaint et al. |
| 2010/0053936 | A1* | 3/2010 | Kiyose ......................... 362/97.1 |

FOREIGN PATENT DOCUMENTS

| CN | 101551960 | 10/2009 |
| TW | I254823 | 5/2006 |
| TW | 200700797 | 1/2007 |
| TW | I286644 | 9/2007 |

OTHER PUBLICATIONS

"First Office Action of China Counterpart Application" with English translation thereof, issued on Feb. 16, 2012, p. 1-5.

* cited by examiner

*Primary Examiner* — Tracie Y Green
(74) *Attorney, Agent, or Firm* — Jianq Chyun IP Office

(57) ABSTRACT

A backlight module includes a light guide plate, an optical film set, and at least one light emitting element. The light guide plate has a first light-emitting surface, a bottom surface, and a first light incident surface. The optical film set on the first light-emitting surface includes at least one optical film having a second light incident surface, a second light-emitting surface, and a side surface. The side surface of the optical film and the first light incident surface of the light guide plate are at the same side, and at least one notch is disposed on the side surface. The light emitting element is adjacent to the first light incident surface and capable of emitting a light beam. The light beam is capable of entering the light guide plate through the first light incident surface and being transmitted to the optical film set via the first light-emitting surface.

8 Claims, 9 Drawing Sheets

BACKLIGHT MODULE WITH OPTICAL FILM HAVING NOTCHES

CROSS-REFERENCE TO RELATED APPLICATION

This application claims the priority benefit of Taiwan application serial no. 98139250, filed on Nov. 18, 2009. The entirety of the above-mentioned patent application is hereby incorporated by reference herein and made a part of this specification.

BACKGROUND OF THE INVENTION

1. Field of the Invention

The invention relates to a backlight module and an optical device thereof, and more particularly to a side incident type backlight module and an optical film set thereof.

2. Description of Related Art

FIG. 1A is an exploded view of a conventional backlight module, and FIG. 1B is an enlarged diagram of a part of the backlight module of FIG. 1A after being assembled. Referring to FIG. 1A and FIG. 1B, in a conventional display device, a uniform surface light source required by a display panel is provided by a backlight module. A conventional backlight module 100 includes a light guide plate 110, a light source component 120, a reflection sheet 130, a lower frame 140a, an upper frame 140b, and a plurality of optical films 150. The light guide plate 110 has a light incident surface 111 and a light-emitting surface 112. The light source component 120 is a light emitting diode bar. The light source component 120 includes a plurality of light emitting elements 122, and the light emitting elements 122 are light emitting diodes (LEDs). The reflection sheet 130 is disposed under the light guide plate 110. The optical films 150, e.g. a diffusion sheet, a prism sheet, and a brightness enhancement sheet, etc., are disposed above the light guide plate 110 and limited to be located between the light guide plate 110 and the upper frame 140b.

A light beam emitted by the light source component 120 enters the light incident surface 111 of the light guide plate 110, and is transmitted to another side opposite to the light incident surface 111 of the light guide plate 110 via total reflection. During the transmission of the light beam, the total reflection of the light beam is destroyed by micro-structures on a bottom surface 114 of the light guide plate 110, and the light beam is emitted from the light-emitting surface 112 of the light guide plate 110. The light guide 110 is capable of converting the light beam emitted by the light source component 120 to a surface light source and guiding the light beam to be transmitted to the optical films 150.

However, since the light source component 120 is disposed at a side of the light incident surface 111 of the light guide plate 110, the brightness at a position is gradually decreased as the distance between the position and the light source component 120 is increased. In other words, the brightness at a position close to the light source component 120 is higher, and the brightness at a position far away from the light source component 120 is lower. The brightness at the position far away from the light source component 120 may be enhanced because a part of the light beam is refracted by the micro-structures of the light guide plate 110 during transmission. However, since the light emitting elements 122 of the light source component 120 are LEDs and LEDs are point light sources, the brightness at the position close to the light emitting elements 122 is higher than the brightness at other positions. Such that partial hot spots at a side close to the light source component 120 occur and then result in non-uniform brightness. Besides, since the optical films 150 includes the diffusion sheet, the prism sheet, and the brightness enhancement sheet, etc. capable of condensing light beam or enhancing the brightness at the positive viewing angle, the problem of the partial hot spots may be easily observed and then result in the non-uniform brightness of the surface light source.

In order to solve the above problem, techniques related to the above are disclosed in TW Patent Publication No. 200700797 and TW Patent No. I286644 and I254823.

SUMMARY OF THE INVENTION

The invention provides a backlight module capable of reducing partial hot spots occurring at a position close to point light sources due to the adoption of the point light sources.

Other objects and advantages of the invention may be further illustrated by the technical features broadly embodied and described as follows.

In order to achieve one or a portion of or all of the objects or other objects, one embodiment of the invention provides a backlight module including a light guide plate, an optical film set, and at least one light emitting element. The light guide plate has a first light-emitting surface, a bottom surface opposite to the first light-emitting surface, and a first light incident surface connecting the first light-emitting surface and the bottom surface. The optical film set is disposed on the first light-emitting surface. The optical film set includes at least one optical film. The optical film has a second light incident surface, a second light-emitting surface opposite to the second light incident surface, and a side surface connecting the second light incident surface and the second light-emitting surface. The side surface of the optical film and the first light incident surface of the light guide plate are located at the same side, and there is at least one notch disposed on the side surface. The light emitting element is disposed adjacent to the first light incident surface, wherein the light emitting element is capable of emitting a light beam. The light beam is capable of entering the light guide plate through the first light incident surface and capable of being transmitted to the optical film set via the first light-emitting surface.

In summary, the embodiment or embodiments of the invention may have at least one of the following advantages:

In the backlight module of the embodiment of the invention, since the side surface of the optical film and the first light incident surface are located at the same side and the notch is disposed on the side surface, the partial hot spots formed at a position of the optical film set close to point light sources are reduced. Thus, uniform light-emitting intensity of the backlight module of the embodiment of the invention is achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
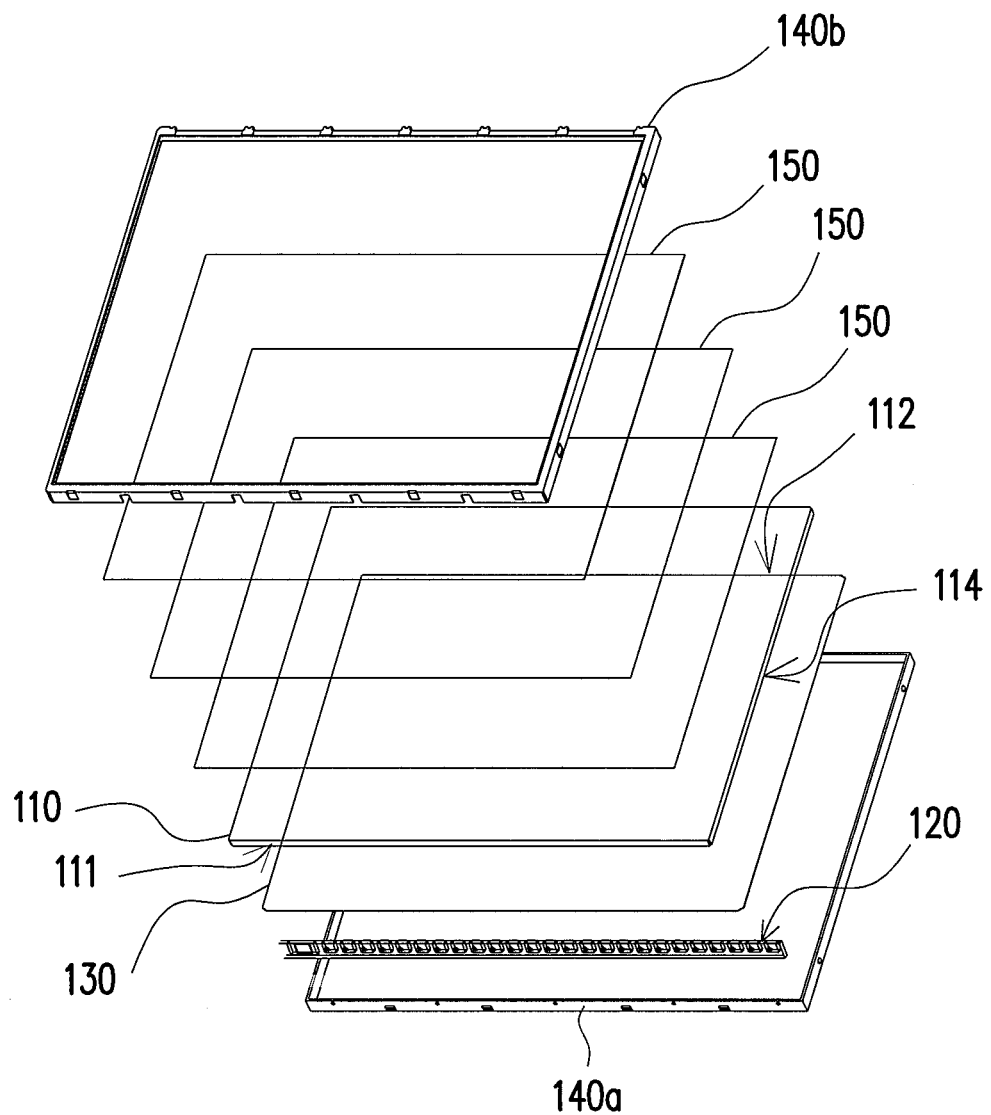
FIG. 1A is an exploded view of a conventional backlight module.
Figure 1B:
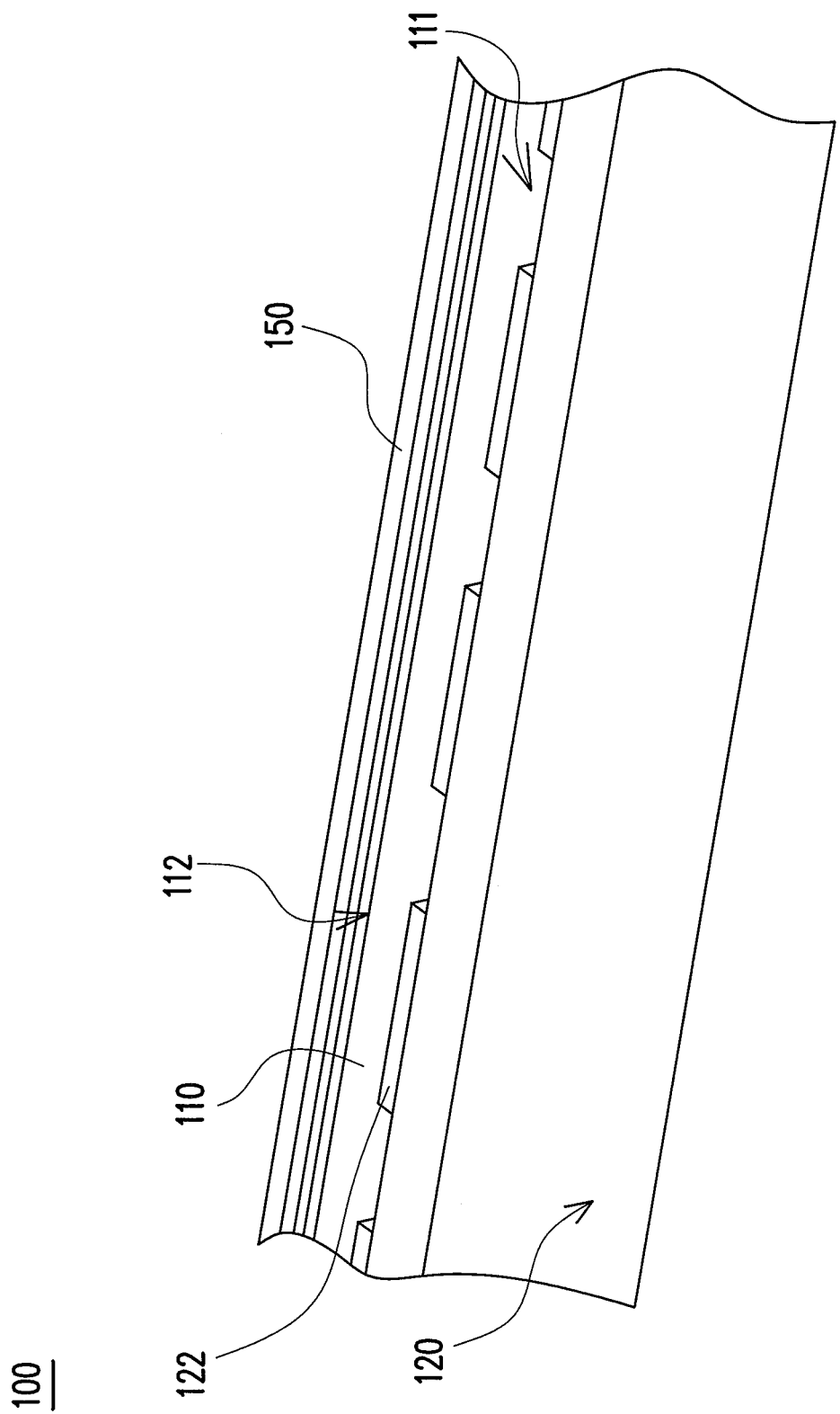
FIG. 1B is an enlarged diagram of a part of the backlight module of FIG. 1A after being assembled.
Figure 2A:
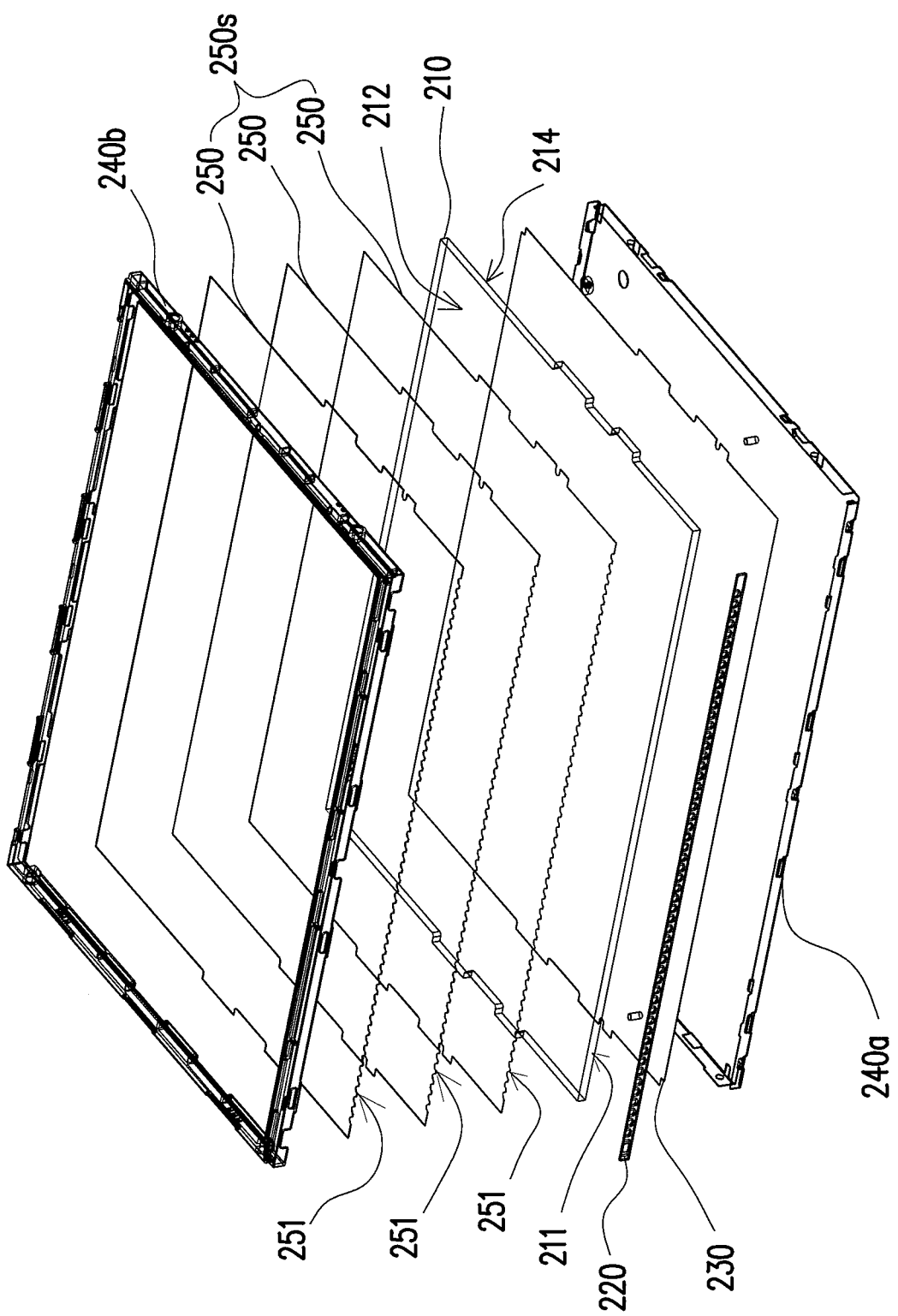
FIG. 2A is an exploded view of a backlight module according to one embodiment of the invention.
Figure 2B:
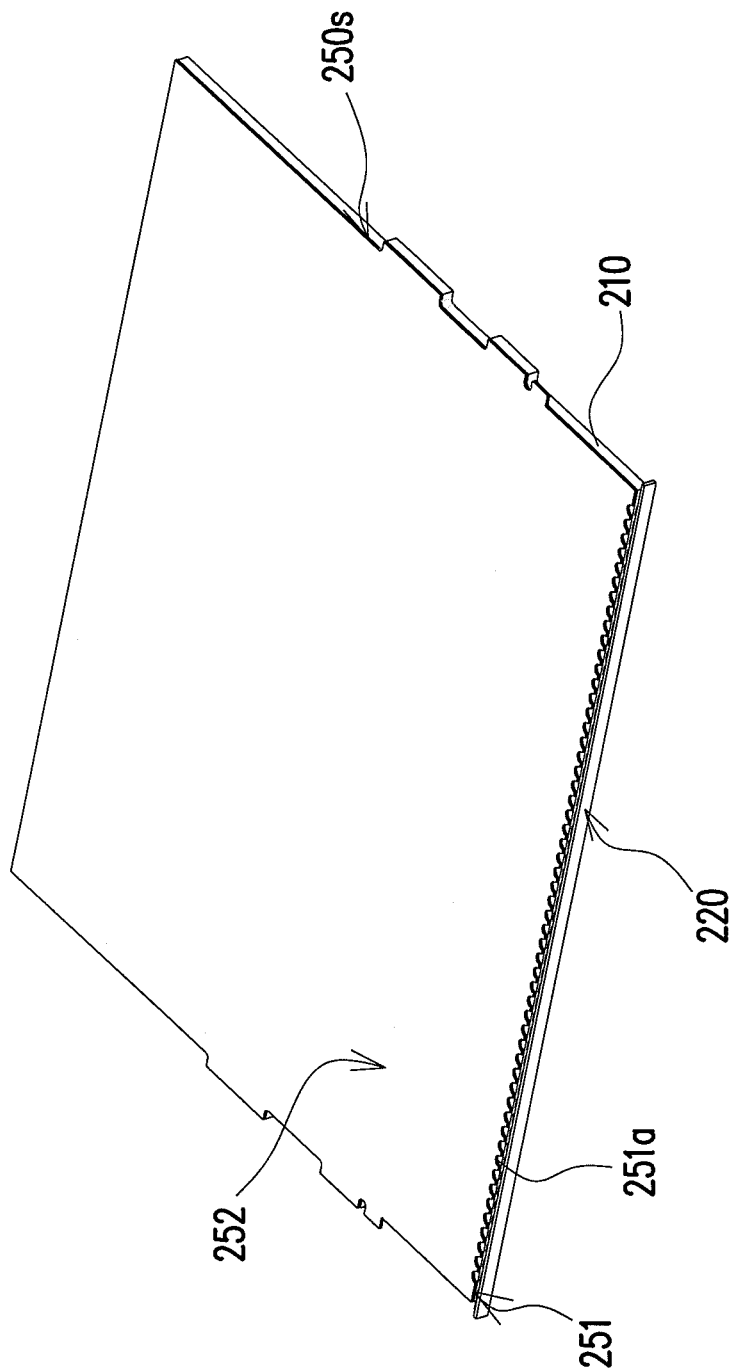
FIG. 2B is a schematic three-dimensional view of the backlight module of FIG. 2A after being assembled.
Figure 2C:
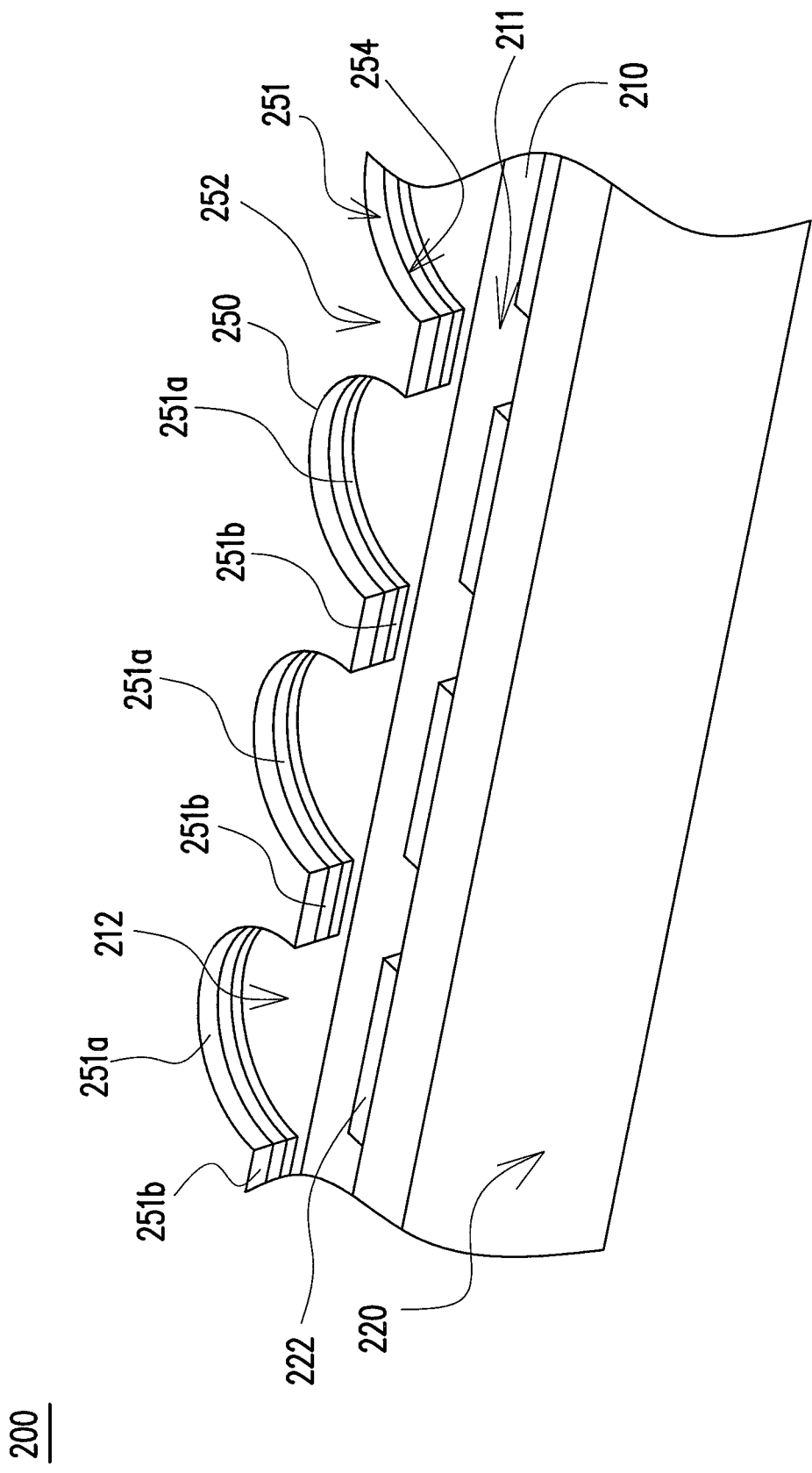
FIG. 2C is an enlarged view of a part of the backlight module of FIG. 2B.

Referring to FIG. 2A, FIG. 2B, and FIG. 2C, a backlight module 200 of the embodiment includes a light guide plate 210, at least one light source component 220, a reflection sheet 230, a lower frame 240a, an upper frame 240b, and an optical film set 250s. In the embodiment, the backlight module 200 is a single-edge side incident type backlight module, and thus the number of the light source component 220 is, e.g. one, but the invention is not limited thereto. The light source component 220 includes at least one light emitting element 222. The light source component 220 is a light emitting diode bar, and the light emitting element 222 is a light emitting diode (LED). In the embodiment, the light source component 220 includes a plurality of light emitting elements 222. The light guide plate 210 has a first light-emitting surface 212, a bottom surface 214 opposite to the first light-emitting surface 212, and a first light incident surface 211 connecting the first light-emitting surface 212 and the bottom surface 214. The light source component 220 is disposed beside the first light incident surface 211 of the light guide plate 210. The reflection sheet 230 is disposed under the light guide plate 210. The optical film set 250s is disposed above the first light-emitting surface 212 of the light guide plate 210, and the position of the optical film set 250s is limited to be located between the light guide plate 210 and the upper frame 240b. The optical film set 250s includes at least one optical film 250. The at least one optical film 250 has a second light incident surface 254, a second light-emitting surface 252 opposite to the second light incident surface 254, and a side surface 251 connecting the second light incident surface 254 and the second light-emitting surface 252. The side surface 251 of the optical film 250 and the first light incident surface 211 of the light guide plate 210 are at the same side, and there is at least one notch 251a disposed on the side surface 251.

Notably, the optical film set 250s includes at least one of a diffusion sheet, a prism sheet, and a brightness enhancement sheet. In the embodiment, the optical film set 250s includes a plurality of optical films, for example, three optical films 250. Referring to FIG. 2A and FIG. 2C, in the embodiment, the optical films 250 of the optical film set 250s are respectively a lower diffusion sheet, a brightness enhancement sheet, and a upper diffusion sheet along a direction from the second light incident surface 254 to the second light incident surface 252, but the invention is not limited thereto. At least one notch 251a is disposed on the side surface 251 of the optical film 250 of the optical film set 250s. In the embodiment, a plurality of notches 251a are disposed on each of the side surfaces 251 of the optical films 250. A spacer 251b exists between the every two neighboring notches 251a. Each of the light emitting elements 222 is adjacent to the spacer 251b. A position of the spacer 251b corresponds to a position between the two neighboring notches 251a, and each of positions of the notches 251a respectively corresponds to the light emitting elements 222. A shape of each of the notches 251a substantially corresponds to a shape of a light-emitting field of the light emitting element 222. In the embodiment, the light emitting element 222 is, for example, a top-emitting package type LED or an LED with a light-emitting field shape close to a semi-circle. Since the light-emitting field shape of this kind of LED is close to a semi-circle, in order to make a shape of the notch 251a of the optical film 250 match with the light-emitting field shape of the light emitting element 222, the shape of the notch 251a of the embodiment is designed as a semi-circle as shown in FIG. 2C, for example. Notably, the shape of the notch 251a may be adjusted according to the light-emitting filed shape of the light emitting element 222 or other optical design considerations. For example, in other embodiments of the invention not depicted herein, the shape of the notch 251a may be an arc or a an ellipse.

In the embodiment, since the light emitting element 222 of the light source component 220 is a point light source, for a position close to the light emitting element 222, the brightness generated by the light emitting element 222 there is higher than the brightness at other positions. However, in the optical film 250 of the embodiment, because the notch 251a is disposed at a position corresponding to the position of the light emitting element 222 (in other words, there is no optical film 250 covering the first light-emitting surface 212 at the position of the notch 251a), a light beam passing through the notch 251a is capable of directly emitting from the first light-emitting surface 212 without passing through the optical film 250. Thus, the brightness at the positive viewing angle corresponding to the position close to light emitting element 220 is partially reduced. Such that partial hot spots occurring at the position close to light emitting element 220 of the backlight module 200 is reduced, and the brightness of the backlight module 200 of the embodiment is uniform.

Figure 3A:
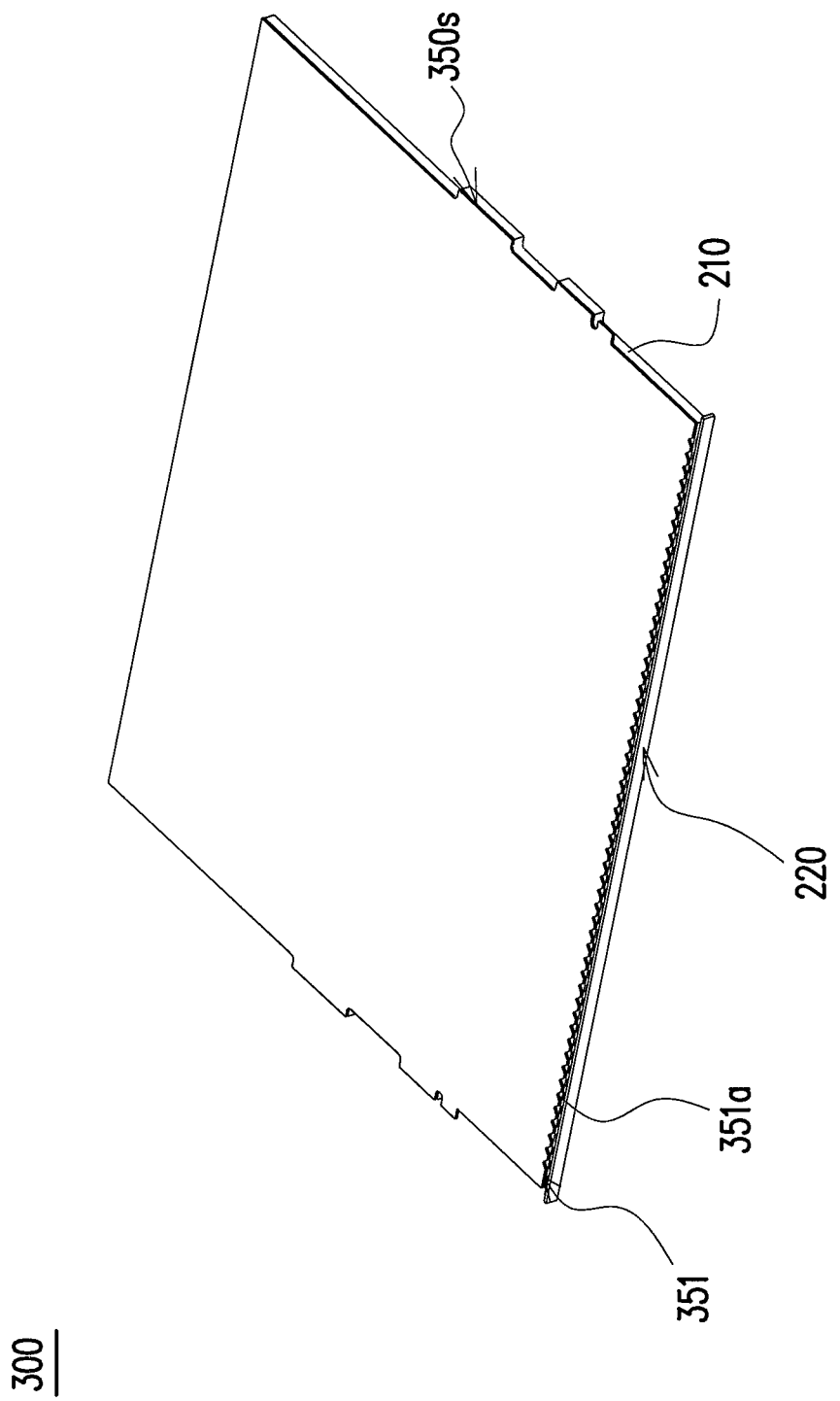
FIG. 3A is a schematic three-dimensional view of a backlight module after being assembled according to another embodiment of the invention.
Figure 3B:
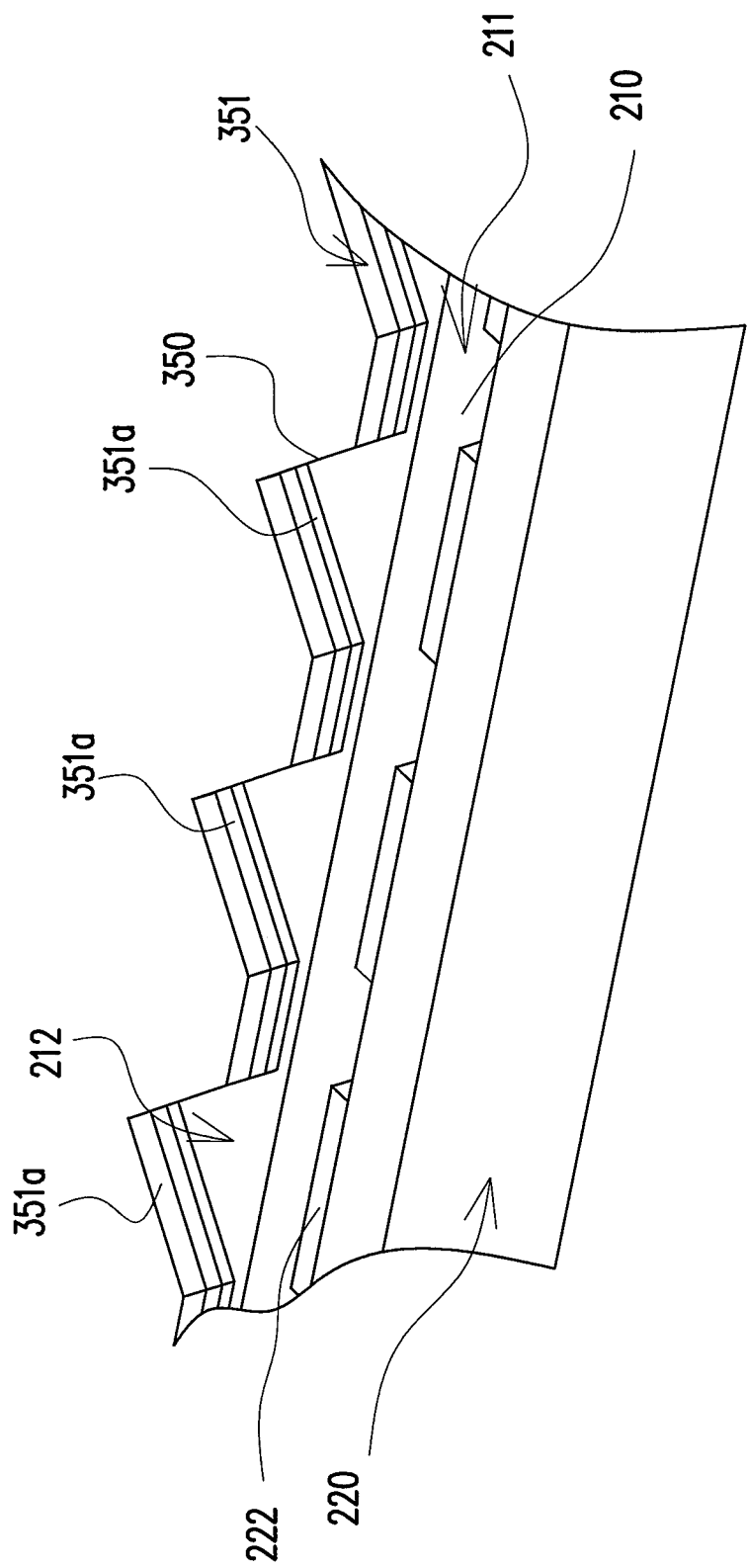
FIG. 3B is an enlarged view of a part of the backlight module of FIG. 3B.

Referring to FIG. 3A and FIG. 3B, the backlight module 300 of the embodiment is similar to the backlight module 200, and to simplify the description of the invention, the components in FIG. 3A and FIG. 3B identical to the ones in FIG. 2B and FIG. 2C are labeled with the same reference number. The main difference between a backlight module 300 of the embodiment and the above backlight module 200 is as follows. The shape of a notch 351a of a side surface 351 on a optical film 350 of a optical film set 350s in the backlight module 300 is a triangle. Besides, the shape or the size of the notch 351a may be adjusted according to the light-emitting filed shape of the light emitting element 222 or other optical design considerations. For example, in other embodiments of the invention not depicted herein, the shape of the notch 351a may be a taper. Functions of the backlight module 300 are similar to the functions of the backlight module 200, and thus is not repeated herein.

Figure 4A:
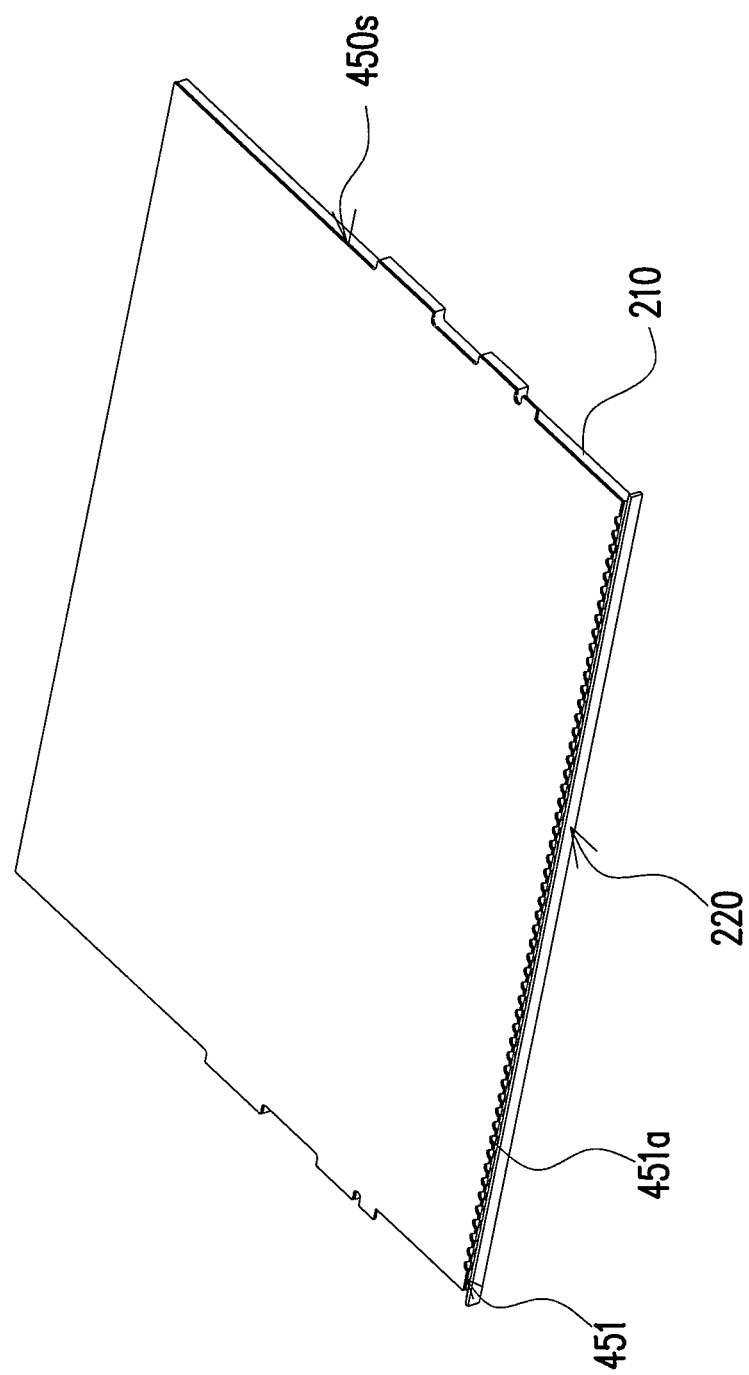
FIG. 4A is a schematic three-dimensional view of a backlight module after being assembled according to another embodiment of the invention.
Figure 4B:
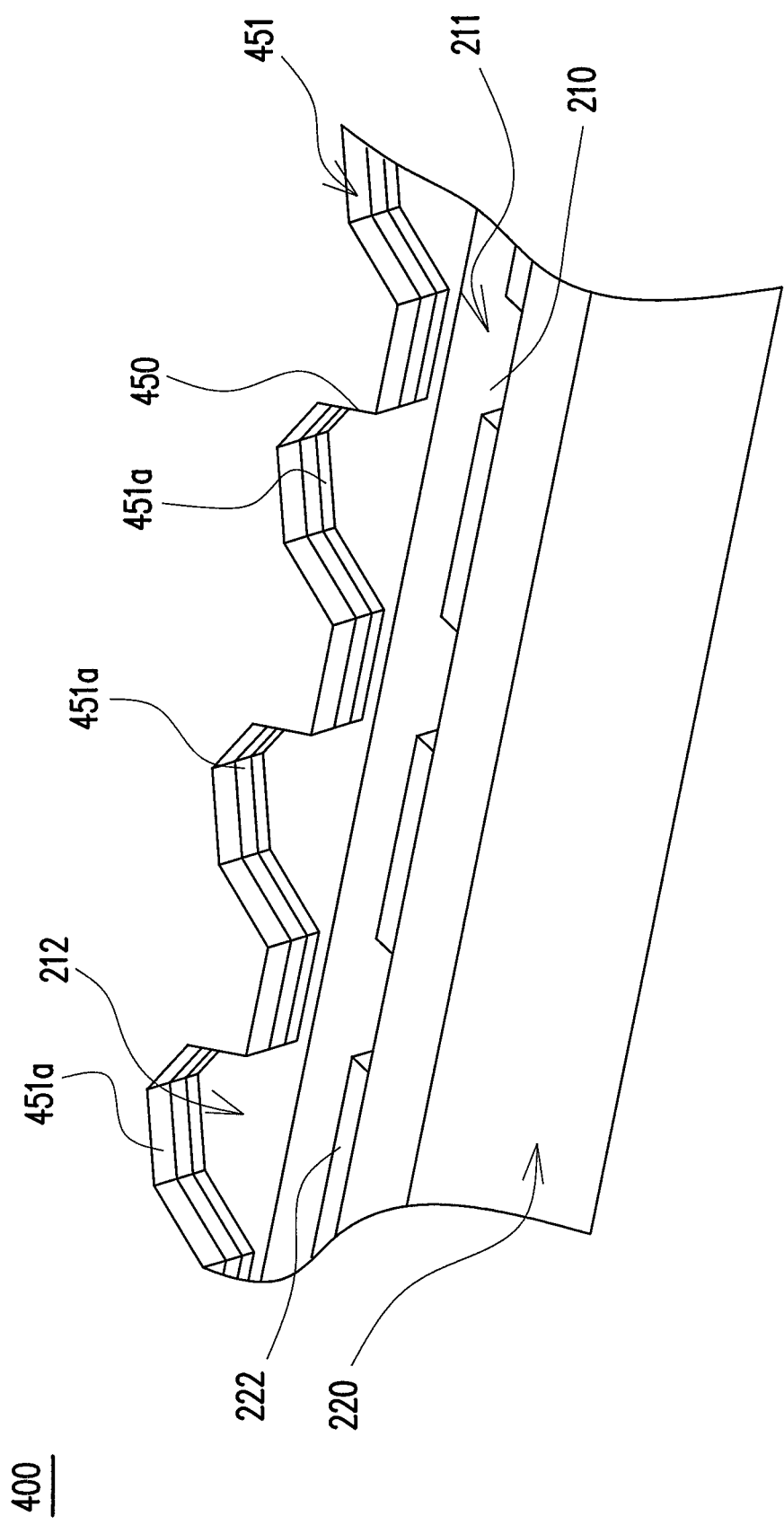
FIG. 4B is an enlarged view of a part of the backlight module of FIG. 4A.

Referring to FIG. 4A and FIG. 4B, the backlight module 400 of the embodiment is similar to the backlight module 200, and to simplify the description of the invention, the components in FIG. 4A and FIG. 4B identical to the ones in FIG. 2B and FIG. 2C are labeled with the same reference number. The main difference between the backlight module 400 of the embodiment and the above backlight module 200 is as follows. The shape of a notch 451a of a side surface 451 on a optical film 450 of a optical film set 450s in the backlight module 400 is a polygon. Besides, the number of sides or the size of the notch 451a may be adjusted according to the light-emitting filed shape of the light emitting element 222 or other optical design considerations. Functions of the backlight module 400 are similar to the functions of the backlight module 200, and thus is not repeated herein.

Notably, in the embodiments of the invention, the notch is disposed on each of the optical films of the optical film set, and the positions, the shapes, and the sizes of the notches and the spacers of the two neighboring films are substantially the same. In other embodiments of the invention not illustrated in the drawings, the positions, the shapes or the sizes of the notch and the spacer may be adjusted according to design requirements. The shape of the notch may be chosen from a group including an arc, a semi-circle, an ellipse, a triangle, a taper, and a polygon.

Besides, in the embodiments of the invention, the notch is disposed on each of the optical films of the optical film set. However, in other embodiments not illustrated in the drawings, the notch may be selectively disposed on at least one of the optical films of the optical film set according to design requirements.

In summary, the embodiment or embodiments of the invention may have at least one of the following advantages:

In the backlight module of the embodiments of the invention, since the side surface of the optical film and the first light incident surface are located at the same side and the notch is disposed on the side surface, the brightness of the hot spots at a position close to the light emitting element is decreased and the partial hot spots at a side of the optical film set close to the point light sources are reduced. Thus, uniform light-emitting intensity of the backlight module of the embodiment of the invention is achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
   a light guide plate, having a first light-emitting surface, a bottom surface opposite to the first light-emitting surface, and a first light incident surface connecting the first light-emitting surface and the bottom surface; and
   an optical film set, disposed on the first light-emitting surface, wherein the optical film set comprises at least one optical film, the at least one optical film has a second light incident surface, a second light-emitting surface opposite to the second light incident surface, and a side surface connecting the second light incident surface and the second light-emitting surface, the side surface of the at least one optical film and the first light incident surface of the light guide plate are located at the same side, there are a plurality of notches disposed on the side surface of the at least one optical film, and there is a spacer between the every two neighboring notches; and
   at least one light emitting element, disposed adjacent to the first light incident surface, wherein the at least one light emitting element is capable of emitting a light beam, and the light beam is capable of entering the light guide plate through the first light incident surface and capable of being transmitted to the optical film set via the first light-emitting surface.

2. The backlight module of claim 1, wherein the optical film set comprises at least one of a diffusion sheet, a prism sheet, and a brightness enhancement sheet.

3. The backlight module of claim 1, wherein a shape of at least one of the notches is an arc, a semi-circle, an ellipse, a triangle, a taper, or a polygon.

4. The backlight module of claim 1, wherein the at least one light emitting element is adjacent to the spacer.

5. The backlight module of claim 1, wherein the at least one light emitting element is a light emitting diode.

6. The backlight module of claim 1, wherein a position of at least one of the notches corresponds to the at least one light emitting element.

7. The backlight module of claim 1, wherein the at least one light emitting element refers to a plurality of light emitting elements, and each of positions of the notches respectively corresponds to the light emitting elements.

8. The backlight module of claim 1, wherein a shape of at least one of the notches substantially corresponds to a shape of a light-emitting field of the at least one light emitting element.

\* \* \* \* \*